(12) United States Patent
Sonoda et al.

(10) Patent No.: US 12,188,411 B2
(45) Date of Patent: Jan. 7, 2025

(54) STATE DETERMINING DEVICE, OPERATION CONTROLLING DEVICE, GAS TURBINE, AND STATE DETERMINING METHOD

(71) Applicant: Mitsubishi Power, Ltd., Kanagawa (JP)

(72) Inventors: Takashi Sonoda, Tokyo (JP); Ryuji Takenaka, Kanagawa (JP); Sosuke Nakamura, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 767 days.

(21) Appl. No.: 17/354,141

(22) Filed: Jun. 22, 2021

(65) Prior Publication Data

US 2021/0310409 A1 Oct. 7, 2021

Related U.S. Application Data

(63) Continuation of application No. 15/545,872, filed as application No. PCT/JP2015/083455 on Nov. 27, 2015, now abandoned.

(30) Foreign Application Priority Data

Feb. 3, 2015 (JP) .................. 2015-019674

(51) Int. Cl.
*F02C 7/05* (2006.01)
*F01D 15/10* (2006.01)
(Continued)

(52) U.S. Cl.
CPC .............. *F02C 7/057* (2013.01); *F01D 15/10* (2013.01); *F01D 21/003* (2013.01); *F02C 9/00* (2013.01);
(Continued)

(58) Field of Classification Search
CPC .. F02C 7/057; F02C 9/00; F02C 9/263; F02C 9/28; F01D 15/10; F01D 21/003;
(Continued)

(56) References Cited

U.S. PATENT DOCUMENTS 6,230,479 B1 5/2001 Kawamura et al.
7,610,745 B2 11/2009 Fujii et al.
(Continued)

FOREIGN PATENT DOCUMENTS

JP 04-071527 3/1992
JP 2006-029162 2/2006
(Continued)

OTHER PUBLICATIONS

International Search Report and Written Opinion of the International Searching Authority, issued Jan. 26, 2016, in corresponding International Application No. PCT/JP2015/083455.
(Continued)

*Primary Examiner* — Santosh R Poudel
(74) *Attorney, Agent, or Firm* — Wenderoth, Lind & Ponack, L.L.P.

(57) ABSTRACT

A state determining device determines a state of a gas turbine connected to an electric generator. The gas turbine includes a compressor that compresses intake air into compression air, a fuel supply device that supplies fuel, a combustor that mixes the compression air supplied from the compressor and the fuel supplied from the fuel supply device and combusts a resultant mixture to generate combustion gas, and a turbine that is rotated with the generated combustion gas.

8 Claims, 6 Drawing Sheets

(51) Int. Cl.
  *F01D 21/00* (2006.01)
  *F02C 7/057* (2006.01)
  *F02C 9/00* (2006.01)
  *F02C 9/26* (2006.01)
  *F02C 9/28* (2006.01)
  *F01D 25/36* (2006.01)

(52) U.S. Cl.
  CPC ............. *F02C 9/263* (2013.01); *F02C 9/28* (2013.01); *F01D 25/36* (2013.01); *F05D 2270/05* (2013.01); *F05D 2270/061* (2013.01); *F05D 2270/303* (2013.01); *F05D 2270/306* (2013.01)

(58) Field of Classification Search
  CPC .............. F01D 25/36; F05D 2270/05; F05D 2270/061; F05D 2270/303; F05D 2270/306
  See application file for complete search history.

(56) References Cited

U.S. PATENT DOCUMENTS

| | | | |
|---|---|---|---|
| 8,844,258 | B2 | 9/2014 | Ekanayake et al. |
| 2003/0093184 | A1 | 5/2003 | Tanaka |
| 2004/0088966 | A1 | 5/2004 | Tanaka |
| 2005/0204745 | A1 | 9/2005 | Hirayama |
| 2006/0101824 | A1 | 5/2006 | Takeda |
| 2007/0079593 | A1 | 4/2007 | Fujii |
| 2007/0089395 | A1 | 4/2007 | Fujii |
| 2007/0271024 | A1 | 11/2007 | Fujii |
| 2009/0063003 | A1* | 3/2009 | Meadows .............. F02C 9/28 415/118 |
| 2009/0151315 | A1 | 6/2009 | Kamohara |
| 2009/0199558 | A1 | 8/2009 | Venkataraman |
| 2010/0319356 | A1 | 12/2010 | Takeda |
| 2011/0146291 | A1 | 6/2011 | Snider |
| 2011/0172893 | A1 | 7/2011 | Nomura |
| 2011/0221422 | A1 | 9/2011 | Gonder |
| 2012/0323343 | A1* | 12/2012 | Grichnik ............ G05B 23/0235 703/2 |
| 2013/0152587 | A1 | 6/2013 | Jordan, Jr. |
| 2013/0318987 | A1 | 12/2013 | Ekanayake |
| 2014/0121935 | A1 | 5/2014 | Zhang |
| 2014/0123666 | A1 | 5/2014 | Ekanayake |
| 2014/0216047 | A1 | 8/2014 | Morisaki |
| 2014/0230449 | A1 | 8/2014 | Saito |
| 2015/0019104 | A1 | 1/2015 | Tanriverdi |
| 2015/0068215 | A1 | 3/2015 | Koganezawa |
| 2015/0159096 | A1 | 6/2015 | Tsutsumi |
| 2015/0354466 | A1 | 12/2015 | Higashi |
| 2016/0003155 | A1 | 1/2016 | Koganezawa |
| 2016/0273456 | A1 | 9/2016 | Zhang |
| 2016/0326967 | A1 | 11/2016 | Yamamoto |
| 2017/0009606 | A1 | 1/2017 | Murayama |
| 2017/0074175 | A1 | 3/2017 | Uyama |
| 2017/0145925 | A1 | 5/2017 | Kusumi |
| 2017/0159562 | A1 | 6/2017 | Takahashi |
| 2017/0211409 | A1 | 7/2017 | Saito |
| 2017/0292458 | A1 | 10/2017 | Nakagawa |
| 2018/0209352 | A1 | 7/2018 | Endo |

FOREIGN PATENT DOCUMENTS

| | | |
|---|---|---|
| JP | 2006-29162 | 2/2006 |
| JP | 2007112160 A * | 5/2007 |
| JP | 2012007538 A * | 1/2012 |
| JP | 2014-194173 | 10/2014 |

OTHER PUBLICATIONS

Official Action dated Jul. 12, 2023 in German Patent Application No. 11 2015 006 101.0 with English translation.

* cited by examiner

STATE DETERMINING DEVICE, OPERATION CONTROLLING DEVICE, GAS TURBINE, AND STATE DETERMINING METHOD

FIELD

The present invention relates to a state determining device, an operation controlling device, a gas turbine, and a state determining method.

BACKGROUND

A gas turbine has a compressor, a combustor, and a turbine. The gas turbine compresses air introduced from an air inlet using the compressor to obtain high-temperature and high-pressure compression air, supplies fuel to the compression air to be combusted by the combustor to obtain high-temperature and high-pressure combustion gas (working fluid), and drives the turbine with the combustion gas. An electric generator is coupled to a rotating shaft of the gas turbine, and the gas turbine rotates the coupled electric generator to generate electricity. The combustion gas used for driving the turbine is discharged as flue gas from a discharge side of the turbine.

An operation controlling device that controls the gas turbine detects states of the compressor, the combustor, and the turbine and adjusts the amount of air to be introduced into the compressor and the amount of fuel to be supplied on the basis of detection results and an instruction value on the operation to control the operation of the gas turbine. Patent Literature 1 describes a gas-turbine controlling device that has a plurality of gas-turbine inlet-gas-temperature detectors that are placed in an annular manner at an inlet high-temperature part of a gas turbine to detect gas-turbine inlet-gas temperatures, a plurality of gas-turbine flue-gas-temperature detectors that are placed in an annular manner at a discharge part of the gas turbine to detect gas-turbine flue-gas temperatures, a first determining unit that determines whether a gas-turbine inlet-gas temperature deviation of the temperatures detected by the gas-turbine inlet-gas-temperature detectors is equal to or larger than an allowable value, a second determining unit that, for one of the gas-turbine inlet-gas-temperature detectors that has detected a largest or smallest temperature value, estimates an estimation temperature of the relevant gas-turbine inlet-gas-temperature detector on the basis of temperatures of gas-turbine inlet-gas-temperature detectors that are adjacent to the relevant gas-turbine inlet-gas-temperature detector, and determines whether the estimation temperature and the detection temperature of the relevant gas-turbine inlet-gas-temperature detector are equal to or larger than a predetermined value, and a sensing unit that senses the relevant gas-turbine inlet-gas-temperature detector that has detected the largest or smallest value as a faulty detector when both determination conditions of the first and second determining units hold.

CITATION LIST

Patent Literature

Patent Literature 1: Japanese Laid-open Patent Publication No. 4-81527 A

SUMMARY

Technical Problem

As described in Patent Literature 1, the gas turbine controls the operation using the detection results of the respective parts. In some cases, the gas turbine uses an output of an electric generator connected to the gas turbine as a parameter to be used for the control of the operation, instead of using a mechanical output that is difficult to detect. However, when the operation is controlled using an output of the electric generator, the gas turbine may be destabilized.

An object of the present invention is to provide a state determining device, an operation controlling device, a gas turbine, and a state determining method for determining an operation state of a gas turbine to enable the gas turbine to operate more stably.

Solution to Problem

To solve the above-described object, a state determining device according to the present invention determines a state of a gas turbine connected to an electric generator. The gas turbine includes a compressor that compresses intake air into compression air, a fuel supply device that supplies fuel, a combustor that mixes the compression air supplied from the compressor and the fuel supplied from the fuel supply device and combusts a resultant mixture to generate combustion gas, and a turbine that is rotated with the generated combustion gas. The state determining device includes an instruction-value detecting unit that detects a difference in an instruction value related to an output of the gas turbine, an output detecting unit that detects a difference in an output of the electric generator, and a determining unit that determines an operation of the gas turbine has departed from a predetermined relation when a difference between the difference in the instruction value and the difference in the output is equal to or larger than a threshold.

Further, it is preferable that the instruction value is a fuel-flow instruction value of fuel to be supplied from the fuel supply device to the combustor.

Further, it is preferable that the instruction-value detecting unit detects a difference between a detected instruction value and an instruction value detected at a last time, and the output detecting unit detects a difference between a detected output and an output detected at a last time.

To solve the above-described object, an operation controlling device according to the present invention includes any of the above-described state determining device, and a controlling device that controls the gas turbine on a basis of the instruction value and the output of the electric generator.

Further, it is preferable that the controlling device changes a value of the detected output of the electric generator to a value with smaller fluctuation when the state determining device has determined that an operation of the gas turbine departs from a predetermined relation.

Further, it is preferable that the controlling device uses a value at a last time as a value of the output of the electric generator when the state determining device has determined that an operation of the gas turbine departs from a predetermined relation.

Further, it is preferable that the controlling device changes a calculated value to a value with smaller fluctuation on a basis of a value of the output of the electric generator when the state determining device has determined that an operation of the gas turbine departs from a predetermined relation.

To solve the above-described object, a gas turbine according to the present invention includes a compressor that compresses intake air into compression air, a fuel supply device that supplies fuel, a combustor that mixes the compression air supplied from the compressor and the fuel supplied from the fuel supply device and combusts a resultant mixture to generate combustion gas, a turbine that is rotated with the generated combustion gas, and any of the above-described operation controlling device.

To solve the above-described object, a state determining method according to the present invention determines a state of a gas turbine connected to an electric generator. The gas turbine includes a compressor that compresses intake air into compression air, a fuel supply device that supplies fuel, a combustor that mixes the compression air supplied from the compressor and the fuel supplied from the fuel supply device and combusts a resultant mixture to generate combustion gas, and a turbine that is rotated with the generated combustion gas. The state determining method includes steps of detecting a difference in an instruction value related to an output of the gas turbine, detecting a difference in an output of the electric generator, and determining that an operation of the gas turbine has departed from a predetermined relation when a difference between the difference in the instruction value and the difference in the output is equal to or larger than a threshold.

DESCRIPTION OF EMBODIMENTS

Exemplary embodiments of the present invention will be explained below in detail with reference to the accompanying drawings. The present invention is not limited to the embodiments. In addition, constituent elements in the embodiments include elements replaceable by those skilled in the art or substantially the same elements. Further, the constituent elements described below can be suitably combined with each other, and when there are a plurality of embodiments, the respective embodiments can also be combined with each other.

Figure 1:
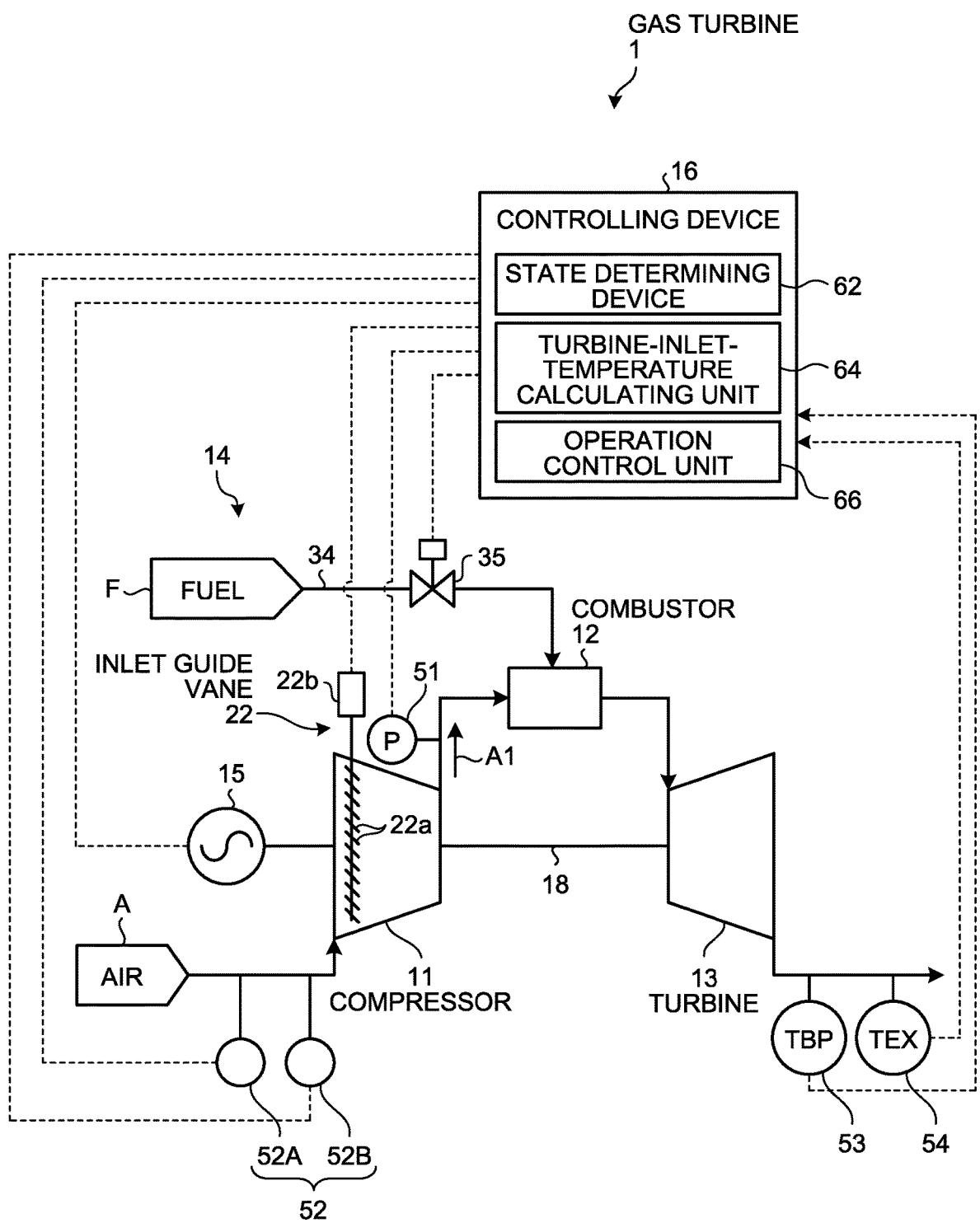
FIG. 1 is a schematic diagram illustrating a gas turbine according to an embodiment of the present invention.

FIG. 1 is a schematic diagram illustrating a gas turbine according to an embodiment of the present invention. A gas turbine 1 according to the present embodiment has a compressor 11, a combustor 12, a turbine 13, a fuel supply device 14, a controlling device 16, and a rotor 18 as illustrated in FIG. 1. The rotor 18 is arranged at central parts of the compressor 11, the combustor 12, and the turbine 13 to pass therethrough. The compressor 11 and the turbine 13 of the gas turbine 1 are coupled by the rotor 18 to be capable of rotating together. The gas turbine 1 is controlled by the controlling device (operation controlling device) 16. An electric generator 15 is coupled to the gas turbine 1. The electric generator 15 has a rotating part coupled to the rotor 18 to be capable of rotating together, and rotates with the rotor 18 to generate electricity.

The compressor 11 compresses air A introduced from an air inlet into compression air A1. An inlet guide vane (IGV) 22 that adjusts an intake amount of the air A introduced from the air inlet is installed in the compressor 11. The intake amount of the air A is adjusted by adjustment of the opening of the inlet guide vane 22. Specifically, the inlet guide vane 22 has a plurality of vane bodies 22a, and an IGV activating unit 22b for changing the vane angle of the vane bodies 22a. The vane angle of the vane bodies 22a is adjusted by the IGV activating unit 22b to adjust the opening of the inlet guide vane 22 and adjust the intake amount of the air A. When the opening of the inlet guide vane 22 is increased, the intake amount of the air A is increased, so that a pressure ratio of the compressor 11 is increased. On the other hand, when the opening of the inlet guide vane 22 is decreased, the intake amount of the air A is reduced, so that the pressure ratio of the compressor 11 is lowered.

The combustor 12 supplies fuel F to the compression air A1 compressed by the compressor 11, mixes the compression air A1 and the fuel F, and combusts the resultant mixture to generate combustion gas. The turbine 13 is rotated with the combustion gas generated by the combustor 12.

The rotor 18 is rotatably supported at both end parts in the axial direction by bearings (not illustrated) and is provided to be rotatable on an axial center. A drive shaft of the electric generator 15 is coupled to one end of the rotor 18 on the side of the compressor 11 (the positional placement is not particularly limited). The electric generator 15 is provided coaxially with the turbine 13 and can generate electricity with rotation of the turbine 13.

Therefore, the air A introduced from the air inlet of the compressor 11 passes the inner part of the compressor 11 through the inlet guide vane 22 and is compressed into the high-temperature and high-pressure compression air A1. The fuel F is supplied from the combustor 12 to the compression air A1 and the compression air A1 and the fuel F are mixed and combusted to generate high-temperature and high-pressure combustion gas. The high-temperature and high-pressure combustion gas generated by the combustor 12 passes through the inner part of the turbine 13, thereby activating (rotating) the turbine 13 to drivingly rotate the rotor 18 and drive the electric generator 15 coupled to the rotor 18. Accordingly, the electric generator 15 coupled to the rotor 18 is rotationally driven to generate electricity. Meanwhile, the combustion gas used for driving the turbine 13 is discharged as flue gas to the atmosphere.

A casing pressure gauge 51, an intake-air state detector 52, a blade path thermometer 53, and a flue gas thermometer 54 are provided in the gas turbine 1. The casing pressure gauge 51 is provided on a line through which the compression air A1 flows from the compressor 11 to the combustor 12, specifically on a casing inner part of the combustor 12, and measures the pressure (casing pressure) of the compression air A1. The intake-air state detector 52 has an intake air thermometer 52A that measures an intake air temperature of the air A to be introduced into the compressor 11, and an intake-air pressure gauge 52B that detects an intake air pressure. The blade path thermometer 53 is provided on a line through which the flue gas discharged from the turbine 13 flows, and measures the temperature of the flue gas that has passed a last-stage blade provided on the downstream side of the turbine 13 in a flue-gas flowing direction. The flue gas thermometer 54 is provided on the downstream side of the blade path thermometer 53 and measures the temperature of the flue gas. The gas turbine 1 also acquires information of an output from the electric generator 15 for detecting load of the gas turbine 1. The output of the electric generator 15 can be measured by an output meter provided in the electric generator 15. Signals measured by the casing pressure gauge 51, the intake-air state detector 52, the blade path thermometer 53, and the flue gas thermometer 54 are input to the controlling device 16.

The controlling device 16 controls parts such as the inlet guide vane 22 and a fuel adjusting valve 35 on the basis of at least one of an instruction value corresponding to an output such as an output request or a fuel-flow instruction value, measurement results of measurement devices such as the casing pressure gauge 51, the intake-air state detector 52, the blade path thermometer 53, and the flue gas thermometer 54, and a measurement result of the output of the electric generator 15, to control the operation of the gas turbine 1.

The controlling device 16 has a state determining device 62, a turbine-inlet-temperature calculating unit 64, and an operation control unit 66. The controlling device 16 includes other calculating units that estimate a state amount on the basis of the measurement results of the measurement devices such as the casing pressure gauge 51, the intake-air state detector 52, the blade path thermometer 53, and the flue gas thermometer 54, and an instruction value, besides the turbine-inlet-temperature calculating unit 64.

Figure 2:
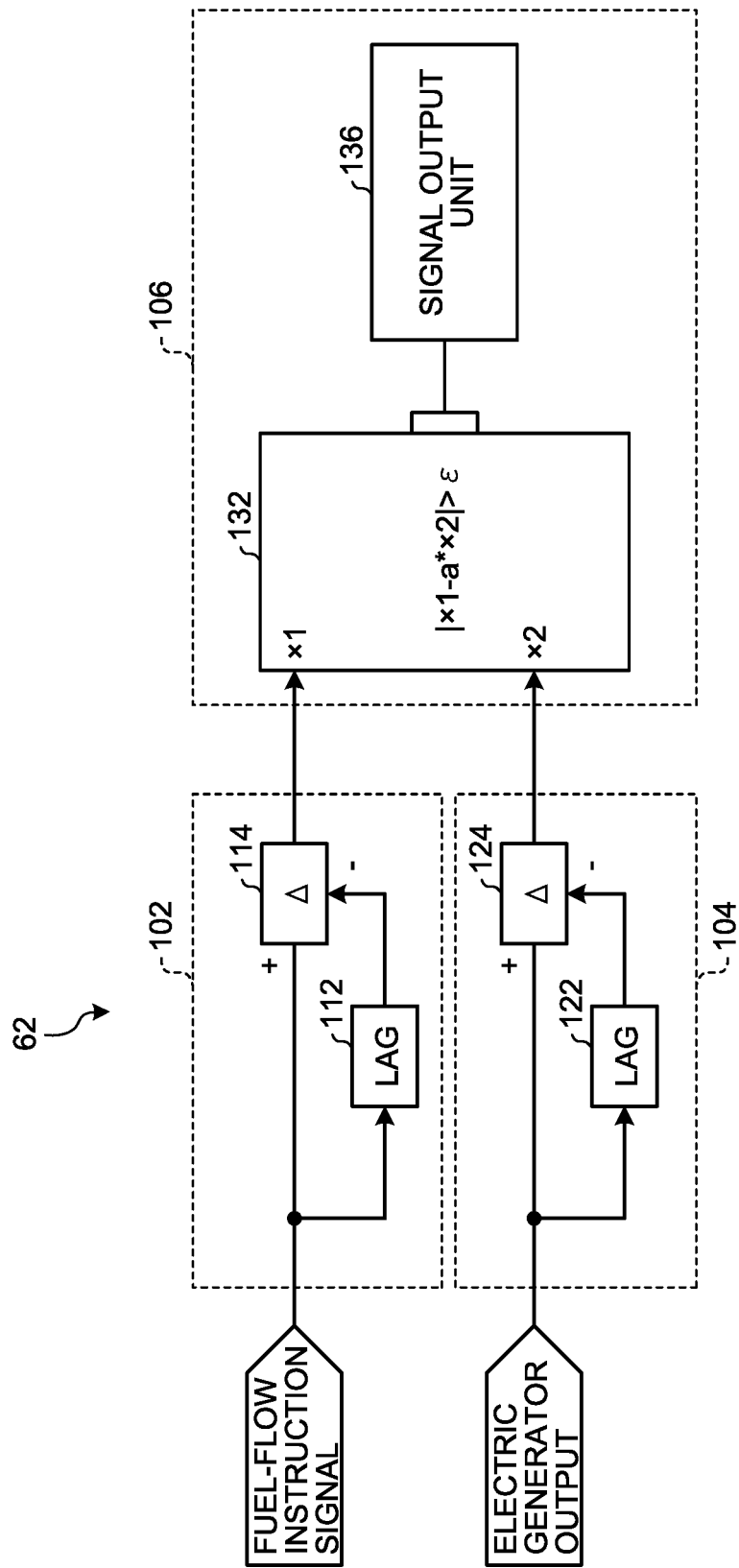
FIG. 2 is a schematic diagram illustrating a general configuration of a state determining device.

FIG. 2 is a schematic diagram illustrating a general configuration of the state determining device. The state determining device 62 determines an operation state of the gas turbine. Specifically, the state determining device 62 determines whether a relation between an instruction value on the fuel flow and an output of the electric generator 15 meets or departs from a predetermined relation. The state determining device 62 has an instruction-value detecting unit 102, an output detecting unit 104, and a determining unit 106.

The instruction-value detecting unit 102 processes a fuel-flow instruction signal to detect a change in the fuel-flow instruction signal. The flue-flow instruction signal is a signal designating a flow rate of the fuel to be supplied to the combustor 12. The instruction-value detecting unit 102 has a first-order lag filter 112 and a subtracter 114. The first-order lag filter 112 and the subtracter 114 are arranged in parallel and the fuel-flow instruction signal is input thereto. The first-order lag filter (LAG) 112 outputs a fuel-flow instruction signal that is the latest one signal before the current fuel-flow instruction signal. The first-order lag filter 112 outputs the latest one fuel-flow instruction signal to the subtracter 114. The subtracter 114 calculates a difference between the fuel-flow instruction signal and the latest one fuel-flow instruction signal which is output from the first-order lag filter 112. The subtracter 114 outputs the calculated difference in the fuel-flow instruction signal to the determining unit 106.

Although only one first-order lag filter 112 is arranged in the instruction-value detecting unit 102, a plurality of first-order lag filters 112 can be placed to be connected in series. When the number of the first-order lag filters 112 is increased, a fuel-flow instruction signal to be subtracted can be a more previous fuel-flow instruction signal. Although the instruction-value detecting unit 102 in the present embodiment uses the fuel-flow instruction signal, it suffices to use an instruction value on the output of the gas turbine 1 and an output request signal for the gas turbine 1 can be used instead of the fuel-flow instruction signal. It suffices that the instruction-value detecting unit 102 can detect a change rate (%/Sec) of the instruction value and a target for which the difference is to be extracted or a target for which the change rate is to be extracted is not particularly limited.

The output detecting unit 104 processes an electric generator output (detection value of an output of the electric generator) to detect a change in the electric generator output. The electric generator output is a value of electricity output from the electric generator 15. The output detecting unit 104 has a first-order lag filter 122 and a subtracter 124. The first-order lag filter 122 and the subtracter 124 are arranged in parallel and the electric generator output is input thereto. The first-order lag filter (LAG) 122 outputs an electric generator output which is the latest one output before the current electric generator output. That is, the first-order lag filter 122 outputs the latest one electric generator output to the subtracter 124. The subtracter 124 calculates a difference between the electric generator output and the latest one electric generator output which is output from the first-order lag filter 122. The subtracter 124 outputs the calculated difference in the electric generator output to the determining unit 106. It suffices that the output detecting unit 104 can detect a change rate (%/Sec) of the output and a target for which the difference is to be extracted or a target for which the change rate is to be extracted is not particularly limited.

The determining unit 106 determines whether the operation state of the gas turbine 1 meets a predetermined relation, specifically whether a relation between the instruction value on the fuel flow and the output of the electric generator 15 meets or departs from a predetermined relation on the basis of a difference x1 detected by the instruction-value detecting unit 102 and a difference x2 detected by the output detecting unit 104. The predetermined relation is a relation in which the fuel flow and the output can be regarded to be proportional to each other. The determining unit 106 has a comparing unit 132 and a signal output unit 136. The comparing unit 132 compares the difference x1 detected by the instruction-value detecting unit 102 with the difference x2 detected by the output detecting unit 104. The comparing unit 132 in the present embodiment multiplies the difference x2 by a factor "a" to match the scales of the difference x1 and the signal, and then detects a difference therebetween to determine whether the difference is larger than a threshold C. Specifically, the comparing unit 132 compares whether $|x1-a^*x2|>\varepsilon$. The comparing unit 132 determines that the relation between the instruction value on the fuel flow and the output of the electric generator 15 departs from the predetermined relation when $|x1-a^*x2|\geq\varepsilon$, and determines that the relation between the instruction value on the fuel flow and the output of the electric generator 15 meets the predetermined relation when $|x1-a^*x2|\leq\varepsilon$.

The signal output unit 136 outputs a signal based on a result of the comparing unit 132. The signal output unit 136 outputs a signal indicating that the state departs from the relation when the comparing unit 132 has determined that the operation state departs from the relation, and outputs a signal indicative of meeting of the relation when the comparing unit 132 has determined that the operation state meets the relation.

Figure 3:
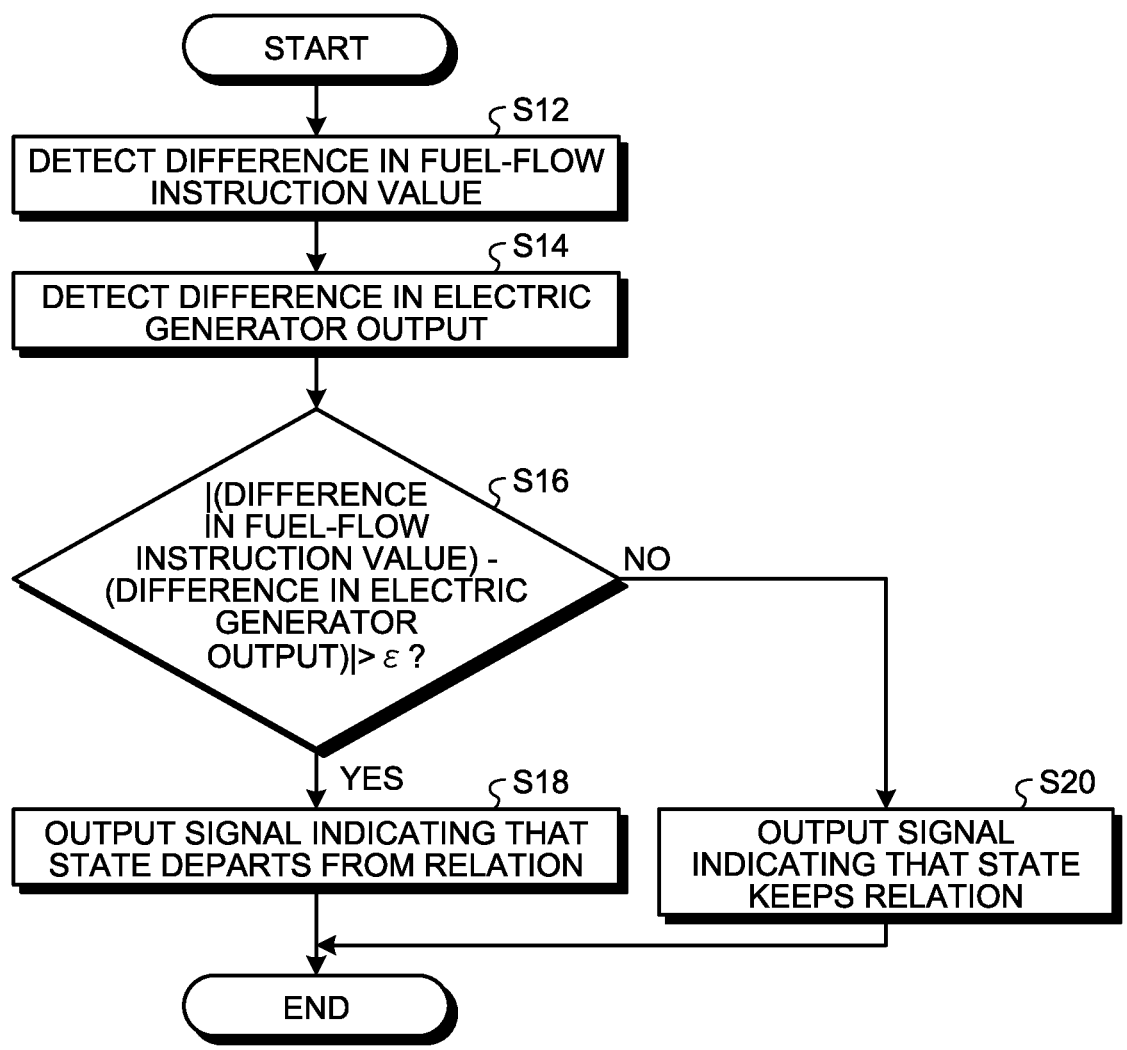
FIG. 3 is a flowchart illustrating an example of a processing operation of the state determining device.

A flow of a processing operation of the state determining device 62 is described next with reference to FIG. 3. FIG. 3 is a flowchart illustrating an example of the processing operation of the state determining device. The state determining device 62 detects a difference in the fuel-flow instruction value with the instruction-value detecting unit 102 (Step S12), and detects a difference in the output of the electric generator 15 with the output detecting unit 104 (Step S14). The processes at Step S12 and Step S14 can be performed in parallel or in a reverse order. The state determining device 62 detects a difference in the fuel-flow instruction value and a difference in the output of the same timing.

Upon detection of the differences, the state determining device 62 determines whether |(difference in fuel-flow instruction value)−(difference in electric generator output)|>ε, that is, |x1−a*x2|>ε with the comparing unit 132 (Step S16). When the state determining device 62 has determined that |(difference in fuel-flow instruction value)−(difference in electric generator output)>ε (YES at Step S16), the signal output unit 136 outputs a signal indicating that the operation state departs from the relation (Step S18). When the state determining device 62 has determined that |(difference in fuel-flow instruction value)−(difference in electric generator output)|≤ε (NO at Step S16), the signal output unit 136 outputs a signal indicating that the operation state keeps the relation (Step S20).

It suffices that the state determining device 62 outputs only either the signal indicating that the state departs from the relation or the signal indicating that the state keeps the relation, without outputting both thereof. In this case, when the signal is not output, the state can be regarded to be the other state than that indicated by the signal.

Figure 4:
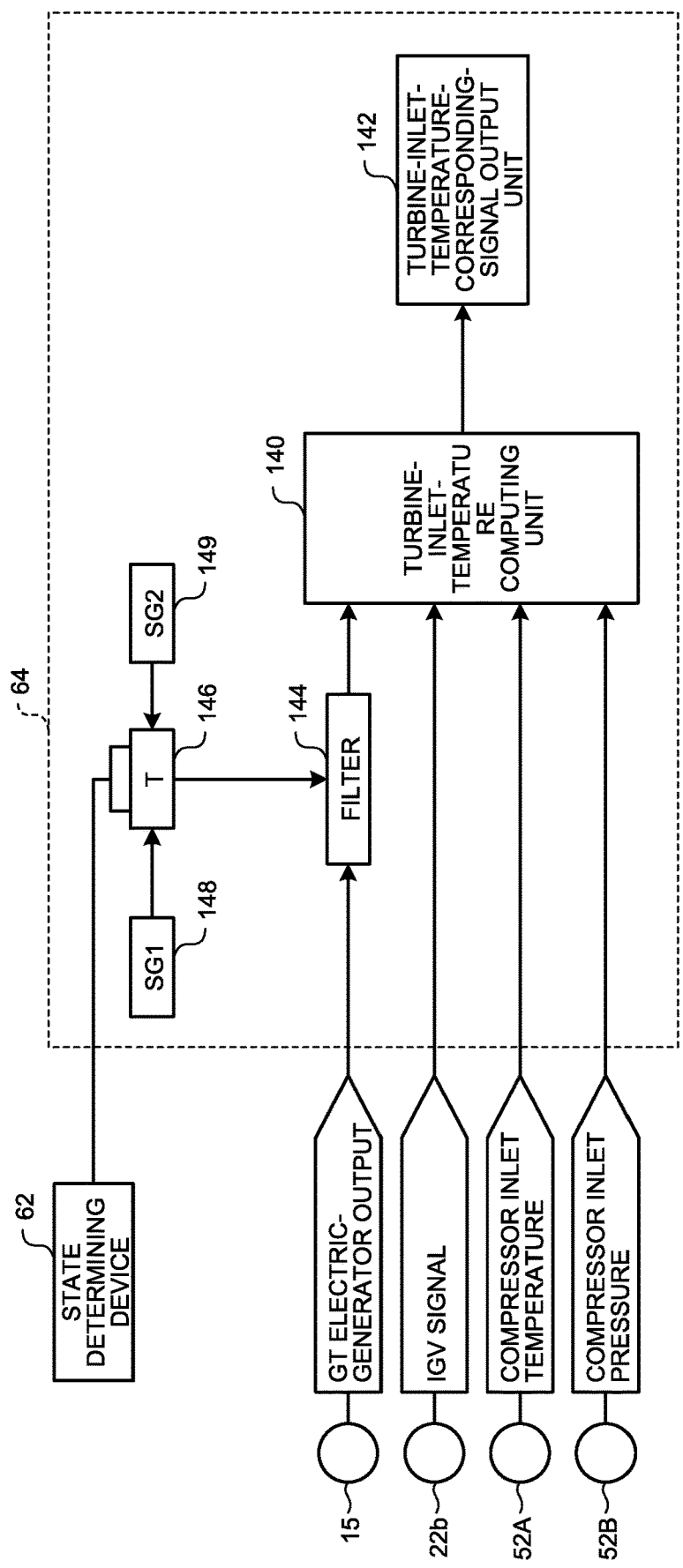
FIG. 4 is a schematic diagram illustrating a general configuration of a turbine-inlet-temperature calculating unit.

FIG. 4 is a schematic diagram illustrating a general configuration of the turbine-inlet-temperature calculating unit. The turbine-inlet-temperature calculating unit 64 estimates a turbine inlet temperature that is difficult to measure. The turbine-inlet-temperature calculating unit 64 calculates an estimation value of the turbine inlet temperature on the basis of the output (gas-turbine (GT) electric-generator output) detected by the electric generator 15, an IGV signal indicating the opening of the inlet guide vane 22, detected by the IGV activating unit 22b, the compressor inlet temperature detected by the intake air thermometer 52A, and the compressor inlet pressure detected by the intake-air pressure gauge 52B.

The turbine-inlet-temperature calculating unit 64 has a turbine-inlet-temperature computing unit 140, a turbine-inlet-temperature-corresponding-signal output unit 142, a filter 144, a signal switcher 146, a signal generator 148, and a signal generator 149.

The output (gas-turbine (GT) electric-generator output) detected by the electric generator 15, the IGV signal indicating the opening of the inlet guide vane 22, detected by the IGV activating unit 22b, the compressor inlet temperature detected by the intake air thermometer 52A, and the compressor inlet pressure detected by the intake-air pressure gauge 52B are input to the turbine-inlet-temperature computing unit 140. The turbine-inlet-temperature computing unit 140 performs computing based on the input values to calculate an estimation value of the turbine inlet temperature.

The turbine-inlet-temperature-corresponding-signal output unit 142 outputs a signal corresponding to the turbine inlet temperature calculated by the turbine-inlet-temperature computing unit 140 to respective parts that execute control using the turbine inlet temperature.

The filter 144 is arranged on a channel through which the GT electric-generator output is input to the turbine-inlet-temperature computing unit 140. The filter 144 is a filter capable of changing the time constant, and generates a lag in fluctuation of the signal detected by the electric generator 15 and input to the turbine-inlet-temperature computing unit 140 by changing the time constant. The filter 144 switches the filter time constant on the basis of a signal input via the signal switcher 146.

The signal switcher 146 is connected to the signal generators 148 and 149 and switches whether the signal generated by the signal generator 148 is input to the filter 144 or the signal generated by the signal generator 149 is input to the filter 144 on the basis of the signal input from the state determining device 62. The signal generators 148 and 149 generate different signals, respectively. When receiving the signal indicating that the state keeps the relation, the signal switcher 146 outputs the signal from the signal generator 148 to the filter 144. When receiving the signal indicating that the state departs from the relation, the signal switcher 146 outputs the signal from the signal generator 149 to the filter 144. The filter 144 applies a first time constant (time constant in normal times) when the signal from the signal generator 148 is input thereto, and applies a second time constant having a value larger than the first time constant when the signal from the signal generator 149 is input thereto.

Figure 5:
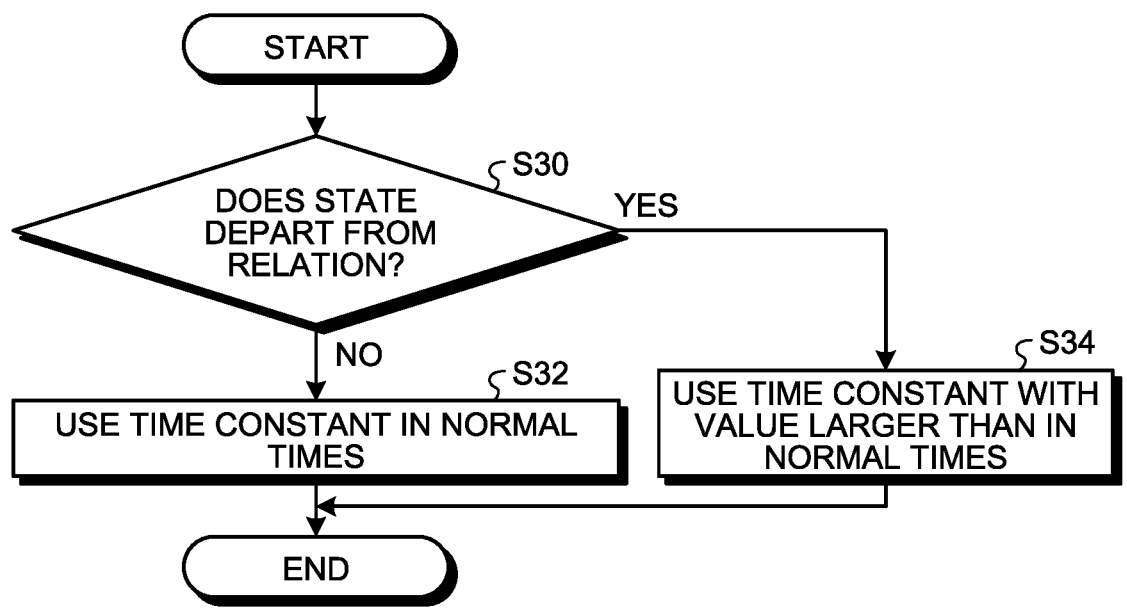
FIG. 5 is a flowchart illustrating an example of a processing operation of the turbine-inlet-temperature calculating unit.

FIG. 5 is a flowchart illustrating an example of a processing operation of the turbine-inlet-temperature calculating unit. FIG. 5 illustrates a selection process of the filter. The turbine-inlet-temperature calculating unit 64 determines whether the state determining device 62 has determined that the state departs from the relation (Step S30). When the state determining device 62 has determined that the state does not depart from the relation (NO at Step S30), the turbine-inlet-temperature calculating unit 64 uses the time constant in normal times (Step S32). When the state determining device 62 has determined that the state departs from the relation (YES at Step S30), the turbine-inlet-temperature calculating unit 64 uses the time constant having a value larger than the normal times (Step S34).

The turbine-inlet-temperature calculating unit 64 switches between the time constants of the filter 144 on the basis of the result of the state determining device 62 in the manner as described above, thereby causing a value with smaller fluctuation than the value of the output detected by the electric generator 15 to be input to the turbine-inlet-temperature computing unit 140 in the state departing from the relation.

The operation control unit 66 controls operations of the respective parts in the gas turbine 1 on the basis of information output from the state determining device 62 and the turbine-inlet-temperature calculating unit 64, the measurement results of the various measurement devices, and the instruction value. For example, the operation control unit 66 executes IGV control to control the IGV activating unit 22b that activates the inlet guide vane 22 to adjust the amount of air (the intake amount of air) to be introduced into the compressor 11. The operation control unit 66 controls the IGV activating unit 22b to change the opening (hereinafter, "IGV opening") of the inlet guide vane 22 to adjust the intake amount of the air A to be introduced into the compressor 11. Specifically, the operation control unit 66 controls the IGV opening to be a rated opening at the time of a full-load operation. The rated opening is an opening at a time when the gas turbine output becomes a rated output. The operation control unit 66 also executes fuel control to control the fuel adjusting valve 35 that is provided on a fuel supply line 34 for supplying the fuel F to the combustor 12 to adjust the supply amount of the fuel F. The operation control unit 66 controls the fuel adjusting valve 35 to adjust the supply amount of the fuel F to be supplied (injected) to the compression air A1.

As described above, in the present embodiment, the state determining device 62 can determine whether the gas turbine 1 is operating in a state meeting the predetermined relation or departing from the predetermined relation. That is, the state determining device 62 can determine whether the output of the electric generator 15 is affected by the number of rotations of a system connected to the electric generator 15, by performing comparison on a difference between the change rate (%/Sec) of the GT electric-generator output and the change rate (%/Sec) of the fuel-flow instruction (CSO) signal which is an example of the change rate of the mechanical output of the gas turbine 1. That is, based on a positive proportional relation held between the change rate of the fuel-flow instruction value and the change rate of the GT electric-generator output, whether the GT electric generator is fluctuated due to a change in the number of system rotations can be sensed depending on whether the change rate of the fuel-flow instruction value and the change rate of the GT electric-generator output depart from the positive proportional relation. This enables the state determining device 62 to appropriately detect whether the electric generator 15 is affected by the number of rotations of the connected system. It is preferable that the state determining device 62 detects calorie of the fuel and performs correction based on the calorie when using the fuel flow.

The controlling device 16 of the present embodiment can stably operate the gas turbine by adjusting the gas-turbine electric-generator output to be input to the turbine-inlet-temperature calculating unit 64 on the basis of the result of the state determining device 62, specifically by setting the gas-turbine electric-generator output to a value with smaller fluctuation than the actual value when the state departs from the relation.

In the embodiment described above, the time constant is adjusted to set the gas-turbine electric-generator output to a value with smaller fluctuation than the actual value when the state determining device 62 has determined that the state departs from the relation. However, the adjustment is not limited thereto and it suffices that fluctuation in the gas-turbine electric-generator output can be reduced. For example, when the state determining device 62 has determined that the state departs from the relation, a value at a time when the state is determined to keep the relation (a value immediately before departing, a last value) can be set as the gas-turbine electric-generator output.

Figure 6:
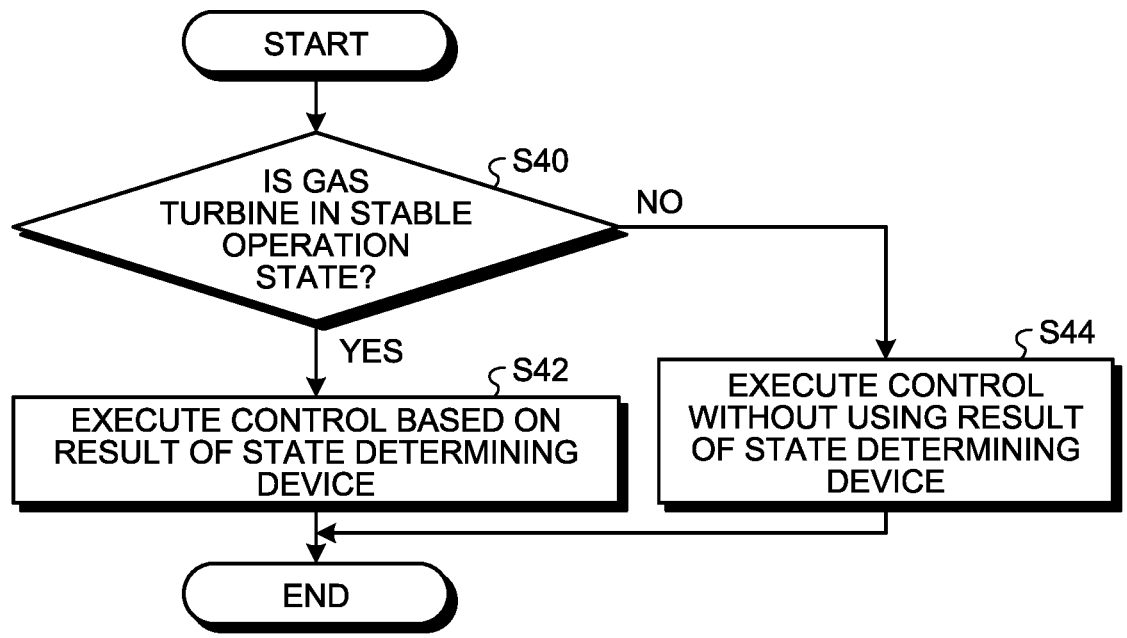
FIG. 6 is a flowchart illustrating an example of a processing operation of the turbine-inlet-temperature calculating unit.

The turbine-inlet-temperature calculating unit 64 may switch between using and not using the result of the state determining device 62 depending on the state of the gas turbine. FIG. 6 is a flowchart illustrating an example of a processing operation of the turbine-inlet-temperature calculating unit. The turbine-inlet-temperature calculating unit 64 determines whether the gas turbine 1 is in a stable operation state (Step S40). The stable operation state is a state in which the gas turbine 1 is operated under a rated condition or in a state keeping a predetermined output for a time equal to or longer than a predetermined period. When the turbine-inlet-temperature calculating unit 64 has determined that the gas turbine 1 is in the stable operation state (YES at Step S40), control is executed based on the result of the state determining device 62 (Step S42). That is, the processes in FIG. 5 described above are performed. When the turbine-inlet-temperature calculating unit 64 has determined that the gas turbine 1 is not in the stable operation state (NO at Step S40), control is executed without using the result of the state determining device 62 (Step S44).

When the gas turbine 1 is not in the stable operation state, the turbine-inlet-temperature calculating unit 64 does not use the result of the state determining device 62, thereby enabling to control with high responsivity in an operation such as at the time of start-up or during when the output is fluctuated based on an instruction value.

While the GT electric-generator output is adjusted on the basis of the result of the state determining device 62 in the present embodiment, the present embodiment is not limited thereto. The turbine-inlet-temperature calculating unit 64 can adjust a result of calculation based on the GT electric-generator output, that is, the calculation value of the turbine-inlet-temperature in the present embodiment, on the basis of the result of the state determining device 62.

Figure 7:
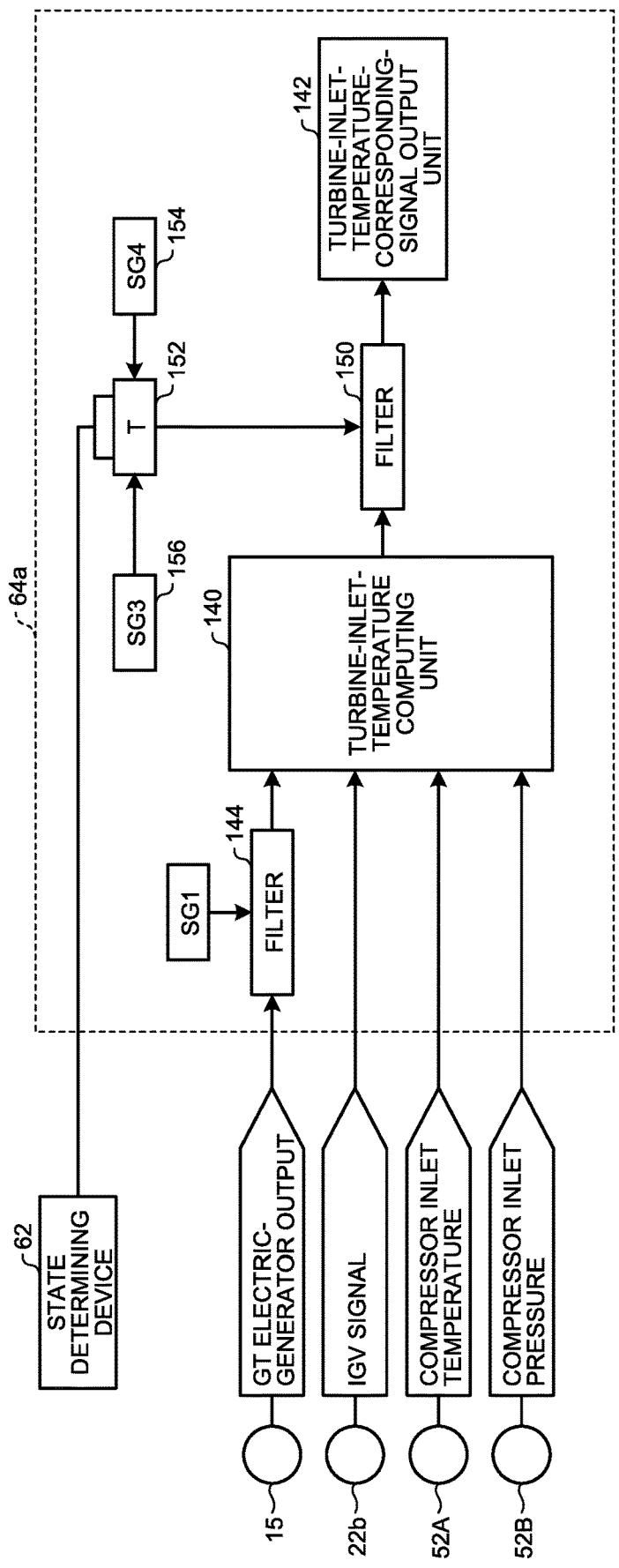
FIG. 7 is a schematic diagram illustrating a general configuration of another example of the turbine-inlet-temperature calculating unit.

FIG. 7 is a schematic diagram illustrating a general configuration of another example of the turbine-inlet-temperature calculating unit. A turbine-inlet-temperature calculating unit 64a illustrated in FIG. 7 has the turbine-inlet-temperature computing unit 140, the turbine-inlet-temperature-corresponding-signal output unit 142, the filter 144, a filter 150, a signal switcher 152, a signal generator 156, and a signal generator 154.

The output (gas-turbine (GT) electric-generator output) detected by the electric generator 15, the IGV signal indicating the opening of the inlet guide vane 22, detected by the IGV activating unit 22b, the compressor inlet temperature detected by the intake air thermometer 52A, and the compressor input pressure detected by the intake-air pressure gauge 52B are input to the turbine-inlet-temperature computing unit 140. The turbine-inlet-temperature computing unit 140 performs computing based on the input values to calculate the estimation value of the turbine inlet temperature.

The turbine-inlet-temperature-corresponding-signal output unit 142 outputs a signal corresponding to the turbine inlet temperature calculated by the turbine-inlet-temperature computing unit 140 to respective parts that execute control using the turbine inlet temperature.

The filter 144 is arranged on a channel through which the GT electric-generator output is input to the turbine-inlet-temperature computing unit 140. The filter 144 is a filter to which the time constant is set, and generates a lag in fluctuation of the signal detected by the electric generator 15 and input to the turbine-inlet-temperature computing unit 140. It is unnecessary to generate a lag by adjusting the time constant of the filter 144.

The filter 150 is arranged between the turbine-inlet-temperature computing unit 140 and the turbine-inlet-temperature-corresponding-signal output unit 142. The filter 150 is a filter that can change the time constant and generates a lag in fluctuation of a signal input from the turbine-inlet-temperature computing unit 140 to the turbine-inlet-temperature-corresponding-signal output unit 142 by changing the time constant. The filter 150 switches the time constant of the filter 150 on the basis of a signal input via the signal switcher 152.

The signal switcher 152 is connected to the signal generators 156 and 154 and switches whether a signal generated by the signal generator 156 is input to the filter 150 or a signal generated by the signal generator 154 is input to the filter 150 on the basis of the signal input from the state determining device 62. The signal generators 156 and 154 generate different signals, respectively. When a signal indicating that the state keeps the relation is received, the signal switcher 152 outputs the signal of the signal generator 156 to the filter 150. When a signal indicating that the state departs from the relation is received, the signal switcher 152 outputs the signal of the signal generator 154 to the filter 150. The filter 150 applies a first time constant (time constant in normal times) when the signal of the signal generator 156 is input thereto, and applies a second time constant having a value larger than the first time constant when the signal of the signal generator 154 is input thereto. The first time constant may be a time constant that allows a signal to pass through as it is.

The turbine-inlet-temperature calculating unit 64*a* adjusts the computing result of the turbine-inlet-temperature computing unit 140 on the basis of the result of the state determining device 62 to reduce fluctuation in the value calculated when the state departs from the relation and stabilize the operation of the gas turbine 1. In this way, identical effects can be obtained also by reducing the fluctuation in the value calculated based on the gas-turbine electric-generator output, instead of adjusting the gas-turbine electric-generator output.

In the embodiment described above, a case where a device using a gas-turbine electric-generator output is the turbine-inlet-temperature calculating unit 64 has been described. However, identical effects can be obtained in other devices using the gas-turbine electric-generator output by similarly performing correction to reduce fluctuation in the gas-turbine electric-generator output or correction to reduce fluctuation in a value calculated using the gas-turbine electric-generator output on the basis of the result of the state determining device 62 when the state departs from the relation.

REFERENCE SIGNS LIST

1 gas turbine
11 compressor
12 combustor
13 turbine
14 fuel supply device
15 electric generator
16 controlling device (operation controlling device)
18 rotor
22 inlet guide vane
22*a* vane body
22*b* IGV activating unit
34 fuel supply line
35 fuel adjusting valve
51 casing pressure gauge
52 intake-air state detector
52A intake air thermometer
52B intake-air pressure gauge
53 blade path thermometer
54 flue gas thermometer
62 state determining device
64, 64*a* turbine-inlet-temperature calculating unit
66 operation control unit
102 instruction-value detecting unit
104 output detecting unit
106 determining unit
112 first-order lag filter
114 subtracter
122 first-order lag filter
124 subtracter
132 comparing unit
136 signal output unit
140 turbine-inlet-temperature computing unit
142 turbine-inlet-temperature-corresponding-signal output unit
144 filter
146 signal switcher
148 signal generator
149 signal generator
150 filter
152 signal switcher
154 signal generator
156 signal generator

The invention claimed is:

1. A controlling device comprising:
a state determining device that determines a state of a gas turbine connected to an electric generator, the gas turbine comprising a compressor that compresses intake air into compression air, a fuel supply device that supplies fuel, a combustor that mixes the compression air supplied from the compressor and the fuel supplied from the fuel supply device and combusts a resultant mixture to generate combustion gas, and a turbine that is rotated with the generated combustion gas,
the state determining device including:
a hardware processor configured to
detect a change rate of a fuel-flow instruction value of fuel to be supplied from the fuel supply device to the combustor,
detect a change rate of an output of the electric generator, and
determine whether the change rate of the fuel-flow instruction value and the change rate of the output of the electric generator are proportional to each other based on the change rate of the fuel-flow instruction value and the change rate of the output of the electric generator;
wherein the controlling device is configured to control the gas turbine based on the fuel-flow instruction value and the output of the electric generator, and
wherein the controlling device includes a turbine-inlet-temperature calculating unit configured to calculate an estimation value of a turbine inlet temperature based on a value of the output of the electric generator,
the controlling device changes a value of a detected output of the electric generator to a value with smaller fluctuation when the state determining device has determined that an operation of the gas turbine departs from a predetermined relation, and
the turbine-inlet-temperature calculating unit calculates the estimation value of the turbine inlet temperature based on the changed value with a smaller fluctuation.

2. A gas turbine comprising:
a compressor that compresses intake air into compression air;
a fuel supply device that supplies fuel;
a combustor that mixes the compression air supplied from the compressor and the fuel supplied from the fuel supply device and combusts a resultant mixture to generate combustion gas;
a turbine that is rotated with the generated combustion gas; and
the controlling device according to claim 1.

3. The controlling device according to claim 1, wherein the change rate of the fuel-flow instruction value is a difference between a detection value of the fuel-flow instruction value that is latest and a detection value of the fuel-flow instruction value that is before a predetermined time, and the change rate of the output of the electric generator is a difference between a detection value of the output that is latest and a detection value of the output that is before a predetermined time.

4. The controlling device according to claim 1, wherein the processor is further configured to determine, when a difference between the change rate of the fuel-flow instruction value and a value obtained by multiplexing the change rate of the output of the electric generator with a predetermined constant or a difference between a value obtained by multiplexing the change rate of the fuel-flow instruction value with a predetermine constant and the change rate of the output of the electric generator is equal to or larger than a predetermined value, that an operation of the gas turbine departs from a relation in which the change rate of the fuel-flow instruction value and the change rate of the output of the electric generator can be regarded as proportional to each other.

5. The controlling device according to claim 1, further comprising:
a first-order lag filter and a subtracter, and that outputs a fuel-flow instruction signal that is latest and a fuel-flow instruction signal that is before a predetermined time and that is output from the first-order lag filter.

6. The controlling device according to claim 1, further comprising:
a first-order lag filter and a subtracter, and that outputs an output of the electric generator that is latest and an output of the electric generator that is before a predetermined time and that is output from the first-order lag filter.

7. A control device, comprising:
a state determining device that determines a state of a gas turbine connected to an electric generator, the gas turbine comprising a compressor that compresses intake air into compression air, a fuel supply device that supplies fuel, a combustor that mixes the compression air supplied from the compressor and the fuel supplied from the fuel supply device and combusts a resultant mixture to generate combustion gas, and a turbine that is rotated with the generated combustion gas,
the state determining device including:
a hardware processor configured to
detect a change rate of a fuel-flow instruction value of fuel to be supplied from the fuel supply device to the combustor,
detect a change rate of an output of the electric generator, and
determine whether the change rate of the fuel-flow instruction value and the change rate of the output of the electric generator are proportional to each other based on the change rate of the fuel-flow instruction value and the change rate of the output of the electric generator;

wherein the controlling device is configured to control the gas turbine based on the fuel-flow instruction value and the output of the electric generator, and
wherein the controlling device includes a turbine-inlet-temperature calculating unit configured to calculate an estimation value of a turbine inlet temperature based on a value of the output of the electric generator, and
the turbine-inlet-temperature calculating unit uses, when the state determining device determines that the operation of the gas turbine departs from a relation in which the change rate of the fuel-flow instruction value and the change rate of the output of the electric generator are proportional to each other, a fuel-flow instruction value that is before a predetermined time for a value of the output of the electric generator to calculate the estimation value of the turbine inlet temperature.

8. A control device, comprising:
a state determining device that determines a state of a gas turbine connected to an electric generator, the gas turbine comprising a compressor that compresses intake air into compression air, a fuel supply device that supplies fuel, a combustor that mixes the compression air supplied from the compressor and the fuel supplied from the fuel supply device and combusts a resultant mixture to generate combustion gas, and a turbine that is rotated with the generated combustion gas,
the state determining device including:
a hardware processor configured to
detect a change rate of a fuel-flow instruction value of fuel to be supplied from the fuel supply device to the combustor,
detect a change rate of an output of the electric generator, and
determine whether the change rate of the fuel-flow instruction value and the change rate of the output of the electric generator are proportional to each other based on the change rate of the fuel-flow instruction value and the change rate of the output of the electric generator;

wherein the controlling device configured to control the gas turbine based on the fuel-flow instruction value and the output of the electric generator, and
wherein the controlling device includes a turbine-inlet-temperature calculating unit configured to calculate an estimation value of a turbine inlet temperature based on a value of the output of the electric generator, and
the turbine-inlet-temperature calculating unit changes, when the state determining device determines that the operation of the gas turbine departs from a relation in which the change rate of the fuel-flow instruction value and the change rate of the output of the electric generator are proportional to each other, a calculated estimation value of the turbine inlet temperature to a value with smaller fluctuation based on a value of the output of the electric generator.

* * * * *